(12) United States Patent
Fujiyoshi et al.

(10) Patent No.: US 8,318,527 B2
(45) Date of Patent: Nov. 27, 2012

(54) MANUFACTURING METHOD OF DISPLAY DEVICE

(75) Inventors: Jun Fujiyoshi, Mobara (JP); Yasukazu Kimura, Chiba (JP); Hideo Tanabe, Mobara (JP)

(73) Assignees: Hitachi Displays, Ltd., Chiba (JP); Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 13/253,232

(22) Filed: Oct. 5, 2011

(65) Prior Publication Data

US 2012/0088325 A1   Apr. 12, 2012

(30) Foreign Application Priority Data

Oct. 8, 2010   (JP) ................... 2010-228201

(51) Int. Cl.
*H01L 33/08* (2010.01)
(52) U.S. Cl. .................. 438/70; 257/E21.214
(58) Field of Classification Search .......... 438/70; 257/E21.214
See application file for complete search history.

(56) References Cited

U.S. PATENT DOCUMENTS 8,184,243 B2 * 5/2012 Kim et al. ............... 349/106
2010/0259709 A1 * 10/2010 Ishigaki et al. ............ 349/106

FOREIGN PATENT DOCUMENTS

| JP | 2000-29014 | 1/2000 |
| JP | 2003-50387 | 2/2003 |

* cited by examiner

*Primary Examiner* — Trung Q Dang
(74) *Attorney, Agent, or Firm* — Antonelli, Terry, Stout & Kraus, LLP.

(57) ABSTRACT

Disclosed is a manufacturing method of a liquid crystal display device where first color filters, second color filters and third color filters which are formed adjacent to each other are provided, the first color filter and the second color filter are patterned in such a manner that one edge portion of the second color filter overlaps an edge portion of the first color filter, and the second color filter and the third color filter are patterned in such a manner that an edge portion of the third color filter overlaps the other edge portion of the second color filter wherein in an exposure step for patterning the second color filter, an exposure quantity in a region corresponding to one edge portion and an exposure quantity in a region corresponding to the other edge portion differ from each other.

8 Claims, 7 Drawing Sheets

MANUFACTURING METHOD OF DISPLAY DEVICE

CROSS-REFERENCE TO RELATED APPLICATION

The present application claims priority from Japanese application JP2010-228201 filed on Oct. 8, 2010, the content of which is hereby incorporated by reference into this application.

BACKGROUND OF THE INVENTION

1. Field of the Invention

The present invention relates to a manufacturing method of a display device, and more particularly to a manufacturing method of a display device where color filters are formed in such a manner that portions of the neighboring color filters overlap each other.

2. Description of the Related Art

A liquid crystal display device includes a first substrate on which thin film transistors are formed and a second substrate on which colored layers referred to as color filters are formed. A liquid crystal panel is formed by joining the first substrate and the second substrate which are arranged to face each other in an opposed manner by way of a liquid crystal layer using a sealing material.

Further, as disclosed in JP 2000-29014 A, there has been known the constitution where color filters of respective colors are formed into a stripe shape corresponding to pixels of red color (R), green color (G) and blue color (B), and neighboring color filters are formed in an overlapping manner at a boundary portion between the pixels. In the constitution disclosed in JP 2000-29014 A, an overlapping portion of the color filters plays a role of a light blocking film (light blocking layer) and hence, the constitution can acquire an advantageous effect that it is unnecessary to form a light blocking film (light blocking layer) which is usually referred to as a black matrix in the boundary portions between the pixels.

Further, as disclosed in JP 2003-50387 A, there has been known the constitution referred to as COA (Color Filter on Array) where thin film transistors and color filters are formed on one substrate out of a pair of opposed facing substrates. Also in the constitution of the COA disclosed in JP 2003-50387 A, color filters are formed in such a manner that portions of the neighboring color filters overlap each other.

SUMMARY OF THE INVENTION

In the constitution described above, unevenness occurs at the overlapping portion of the color filters and hence, there arises a drawback that contrast is lowered due to a rubbing defect caused by the unevenness or the like. To reduce the unevenness, it is necessary to form a leveling film formed of an organic insulation film, for example, such that the leveling film covers the color filters.

The formation of the leveling film to reduce the unevenness which occurs in the overlapping portion of the color filters gives rise to a drawback that the number of steps is increased. Further, in the constitution of the COA, to make the thin film transistor formed below the color filter and a pixel electrode formed over the color filter and the leveling film conductive with each other, it is necessary to form a contact hole in the leveling film. Accordingly, the number of steps is further increased.

The present invention has been made in view of these drawbacks, and it is an object of the present invention to provide a technique which can, even when color filters are formed in a state where portions of neighboring color filters overlap with each other, level surfaces of the color filters by reducing unevenness of an overlapping portion of the color filters without forming a leveling film additionally.

(1) To overcome the above-mentioned drawbacks, according to one aspect of the present invention, there is provided a manufacturing method of a display device having first color filters, second color filters and third color filters formed adjacent to each other on one substrate out of a pair of substrates which are arranged to face each other in an opposed manner, the manufacturing method including; a first patterning step in which the first color filters are patterned; a second patterning step in which the second color filters are patterned in such a manner that one edge portion of the second color filter overlaps and is in physical contact with one edge portion of the first color filter; and a third patterning step in which third color filers are patterned in such a manner that one edge portion of the third color filter overlaps and is in physical contact with the other edge portion of the second color filter different from one edge portion of the second color filter, wherein the second patterning step includes: a second exposure step in which a second color resist film is exposed after the second color resist film is applied; and a second color resist development step in which the second color resist film is developed, and in the second exposure step, an exposure quantity in a region corresponding to the one edge portion of the second color filter and an exposure quantity in a region corresponding to the other edge portion of the second color filter differ from each other.

(2) In the manufacturing method of a display device having the above-mentioned constitution (1), the third patterning step includes a step where the other edge portion of the third color filter, which is different from one edge portion of the third color filter, is formed in an overlapping manner on the other edge portion of the first color filter different from one edge portion of the first color filter, the first patterning step includes a first exposure step where a first color resist film is exposed after the first color resist film is applied, and the third patterning step includes a third exposure step where a third color resist film is exposed after the third color film is applied, in the first exposure step, an exposure quantity in a region corresponding to one edge portion of the first color filter and an exposure quantity in a region corresponding to the other edge portion of the first color filter are equal, and in the third exposure step, an exposure quantity in a region corresponding to one edge portion of the third color filter and an exposure quantity in a region corresponding to the other edge portion of the third color filter are equal.

(3) In the manufacturing method of a display device having the above-mentioned constitution (1) or (2), the second color resist film is exposed by way of a photo mask in the second exposure step, the photo mask is a halftone mask where a light transmission quantity in a region corresponding to one edge portion and the other edge portion of the second color filter is smaller than a light transmission quantity in a region other than one edge portion and the other edge portion, and a light transmission quantity in a region corresponding to one edge portion and a light transmission quantity in a region corresponding to the other edge portion are different from each other.

(4) In the manufacturing method of a display device having any one of the above-mentioned constitutions (1) to (3), a plurality of pixels each of which includes a pixel electrode and a thin film transistor are formed on one substrate, and the first color filter, the second color filter and the third color filter are formed above the thin film transistor.

(5) In the manufacturing method of a display device having the above-mentioned constitution (4), the pixel electrode is formed above the first color filter, the second color filter and the third color filter.

(6) In the manufacturing method of a display device having the above-mentioned constitution (4) or (5), a plurality of drain lines which supply a video signal to the pixel electrodes through the thin film transistors are formed on one substrate, and a overlapped region of any two color filters of the first color filter, the second color filter and the third color filter overlaps the drain line.

(7) In the manufacturing method of a display device having any one of the above-mentioned constitutions (1) to (6), the first color filter, the second color filter and the third color filter have colors which differ from each other, and the colors which differ from each other are red, green and blue.

(8) In the manufacturing method of a display device having any one of the above-mentioned constitutions (1) to (7), a overlapped region where any two color filters of the first color filter, the second color filter and the third color filter has an approximately arcuate curved surface, and a radius of curvature of the curved surface is set to 1.0 μm or more.

According to the present invention, even when color filters are formed by overlapping portions of the neighboring color filters, surfaces of the color filters can be made flat by reducing the unevenness of color filter overlapping without additionally forming a leveling film.

Other advantageous effects of the present invention will become apparent from the description of the whole specification.

DETAILED DESCRIPTION OF THE INVENTION

Hereinafter, embodiments to which the present invention is applied are explained in conjunction with drawings. In the explanation made hereinafter, identical constitutional elements are given same symbols and the repeated explanation of these elements is omitted.

Embodiment 1

[Overall Constitution]

Figure 1A:
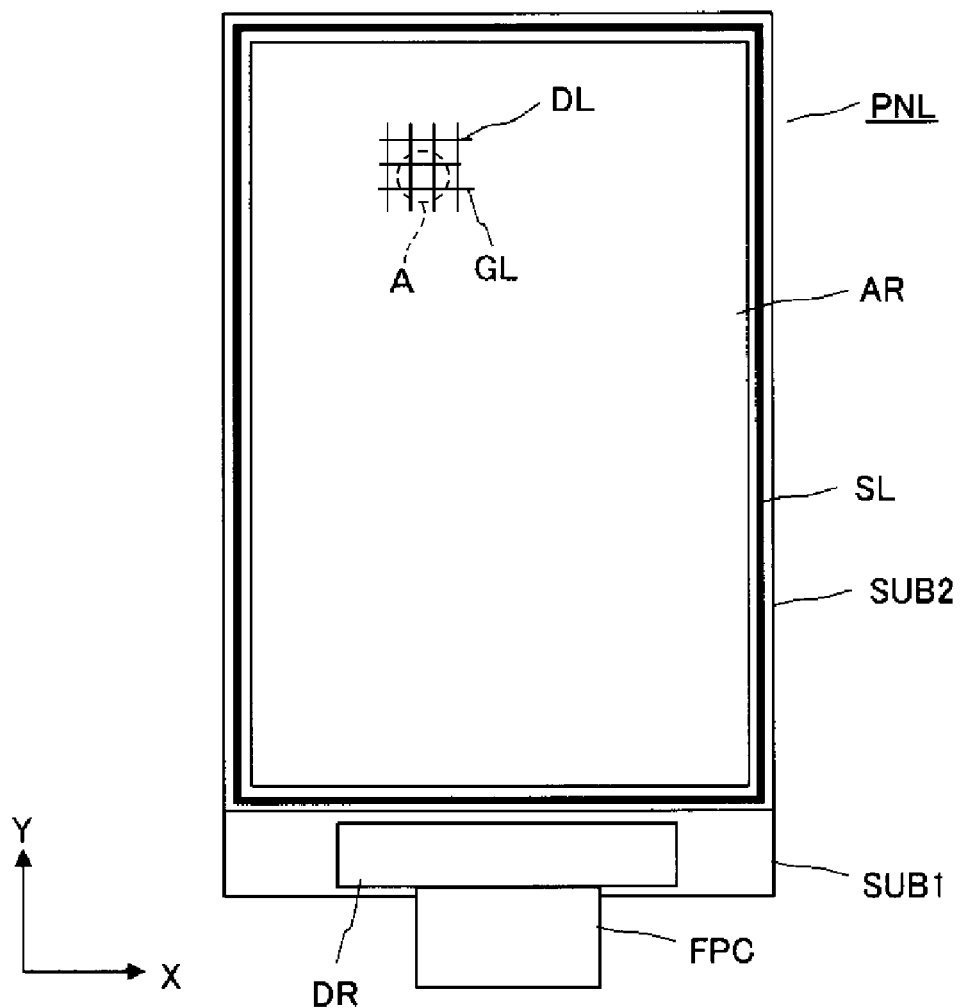
FIG. 1A is a view for explaining the schematic constitution of a liquid crystal display device which is a display device according the an embodiment 1 of the present invention.

FIG. 1A is a view for explaining the schematic constitution of a liquid crystal display device which is a display device according to the embodiment 1 of the present invention. Hereinafter, the overall constitution of the liquid crystal display device according to the embodiment 1 is explained in conjunction with FIG. 1A. Symbols X, Y shown in FIG. 1A indicate an X axis and a Y axis respectively. In the explanation made hereinafter, the explanation is made with respect to a case where the present invention is applied to an IPS-type liquid crystal display device where an electric field having components parallel to a main surface of a first substrate SUB1 is applied. However, the present invention is also applicable to other liquid crystal display devices such as a TN-type liquid crystal display device and a VA-type liquid crystal display device. Also in the explanation made hereinafter, the explanation is made with respect to a case where colored layers (color filters) having the same color extend along drain lines in the Y direction, and the color filters of red (R), green (G) and blue (B) are arranged parallel to each other in the X direction in this order. However, the colored layers may be arranged in accordance with other methods.

As shown in FIG. 1A, the liquid crystal display device according to the embodiment 1 includes a liquid crystal display panel PNL which is constituted of a first substrate SUB1 having the COA (Color Filter on Array) structure on which pixel electrodes (second electrodes) PX, thin film transistors TFT, color filters not shown in the drawing and the like are formed, a second substrate SUB2 which is arranged so as to face the first substrate SUB1 in an opposed manner, and a liquid crystal layer not shown in the drawing which is sandwiched between the first substrate SUB1 and the second substrate SUB2. The liquid crystal display device is constituted by combining the liquid crystal display panel PNL and a backlight unit (backlight device) not shown in the drawing which constitutes a light source of the liquid crystal display panel PNL. To explain the fixing of the first substrate SUB1 and the second substrate SUB2 and the sealing of liquid crystal, the first substrate SUB1 and the second substrate SUB2 are fixed to each other using a seal material SL which is annularly applied to a peripheral portion of the second substrate SUB2, and liquid crystal is also sealed in a space defined by the first substrate SUB1, the second substrate SUB2 and the seal material SL. Further, the second substrate SUB2 has an area smaller than an area of the first substrate SUB1 and hence, a side portion of the first substrate SUB1 on a lower side of the drawing is exposed. On the side portion of the first substrate SUB1, a drive circuit DR which is constituted of a semiconductor chip is mounted. The drive circuit DR drives respective pixels arranged in a display region AR. In the explanation made hereinafter, there may be a case where even when the explanation is made with respect to the liquid crystal display panel PNL, the liquid crystal display panel PNL is referred to as "liquid crystal display device".

In the first substrate SUB1 and the second substrate SUB2, for example, a well-known glass substrate is used as a base material of these substrates in general. However, the base material of the first substrate SUB1 and the second substrate SUB2 is not limited to the glass substrate, and may be formed of other insulation substrate made of quartz glass or plastic (resin).

In the liquid crystal display device according to the embodiment 1, within a region in which liquid crystal is sealed, a region where display pixels (hereinafter, referred to as "pixels") are formed constitutes the display region AR. Accordingly, even when an area falls within the region in which liquid crystal is sealed, if the pixels are not formed in the area so that the area is irrelevant to display, the area does not constitute the display region AR.

In the liquid crystal display device according to the embodiment 1, on a liquid-crystal-side surface of the first substrate SUB1 within the display region AR, scanning signal lines (gate lines) GL which extend in the X direction and are arranged parallel to each other in the Y direction in FIG. 1A and to which a scanning signal is supplied from the drive circuit DR are formed. Further, on the liquid-crystal-side surface of the first substrate SUB1 within the display region AR, video signal lines (drain lines) DL which extend in the Y direction and are arranged parallel to each other in the X direction in FIG. 1A and to which a video signal (gradation signal) is supplied from the drive circuit are formed. A region which is surrounded by two neighboring drain lines DL and two neighboring gate lines GL constitutes the pixel, and a plurality of pixels are arranged in the display region AR in a matrix array along the drain lines DL and the gate lines GL. In the liquid crystal display device according to the embodiment 1, as described later in detail, neighboring color filters are formed above the drain line DL in an overlapping manner, and an overlapping portion functions as a light blocking region.

Figure 1B:
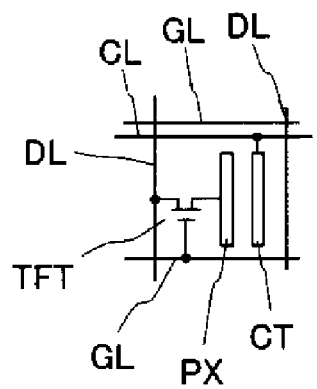
FIG. 1B is an enlarged view of a portion A shown in FIG. 1A.

Each pixel includes, for example, as shown in FIG. 1B which is an equivalent circuit diagram of an area indicated by a circle A in FIG. 1A, a thin film transistor TFT which is turned on or off in response to a scanning signal through the gate line GL, a pixel electrode PX to which a video signal from the drain line DL is supplied through the turned-on thin film transistor TFT, and a common electrode CT to which a common signal having a potential which becomes the reference with respect to a potential of the video signal is supplied through a common line CL from one end of a left and right sides or from both sides in the X direction (end portion of the first substrate SUB1). The thin film transistor TFT of the embodiment 1 is driven in such a manner that a drain electrode and a source electrode are exchanged corresponding to an applied bias. In this specification, however, for the sake of convenience, an electrode which is connected to the drain line DL is referred to as the drain electrode DT, and an electrode which is connected to the pixel electrode PX is referred to as the source electrode ST. Further, in the embodiment 1, as described later in detail, a color filter and a light blocking film (light blocking region) which is formed by overlapping the color filters of two different colors are formed above the thin film transistor TFT, and the pixel electrode PX and the common electrode CT are formed above the color filter.

An electric field having components parallel to a main surface of the first substrate SUB1 is generated between the pixel electrode PX and the common electrode CT, and liquid crystal molecules are driven by the electric field. The liquid crystal display device having such a constitution has been known as a liquid crystal display device which can perform a so-called wide viewing angle display, and is referred to as an IPS-type or a lateral-electric-field-type liquid crystal display device because of a specific property in applying an electric field to liquid crystal. In the liquid crystal display device having such a constitution, the display is performed in a normally black display mode where light transmissivity is minimized (black display) when an electric field is not applied to liquid crystal, and light transmissivity is increased by applying an electric field to liquid crystal.

The end portions of respective drain lines DL and the respective gate lines GL extend beyond the seal material SL, and are connected to the drive circuit DR which generates drive signals such as a video signal and a scanning signal in response to an input signal inputted to the drive circuit DR from an external system through a flexible printed circuit board FPC. In the liquid crystal display device according to the embodiment 1, the drive circuit DR is formed of a semiconductor chip and is mounted on the first substrate SUB1. However, the liquid crystal display device may be configured such that either one of a video signal drive circuit which outputs a video signal and a scanning signal drive circuit which outputs a scanning signal or both drive circuits is/are mounted on the flexible printed circuit board FPC using a tape carrier method or a COF (Chip On Film) method and is/are connected to the first substrate SUB1.

In the liquid crystal display device according to the embodiment 1, a common signal is inputted to the common electrode CT which is independently formed for every pixel through the common line CL. However, the liquid crystal display device is not limited to such a constitution, and the common electrode CT may be formed over at least the whole surface of the display region AR.

[Constitution of Pixel]

Figure 2:
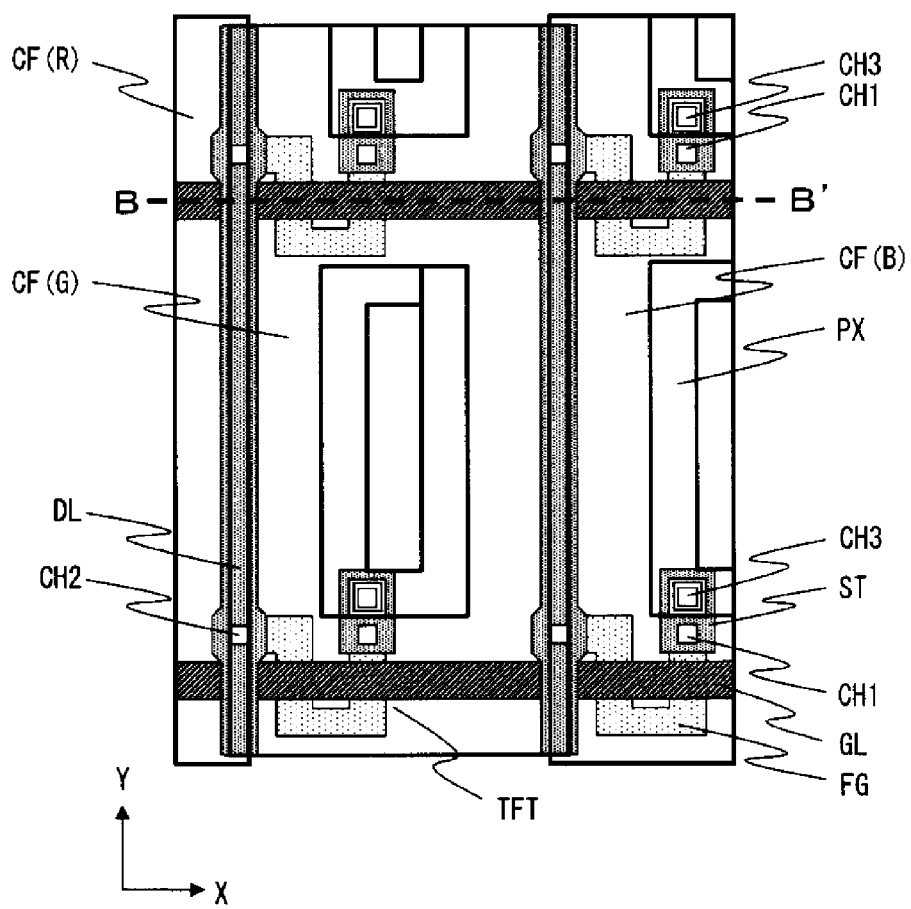
FIG. 2 is a top plan view for explaining the schematic constitution of pixel of the liquid crystal display device according to the embodiment 1 of the present invention.
Figure 3:
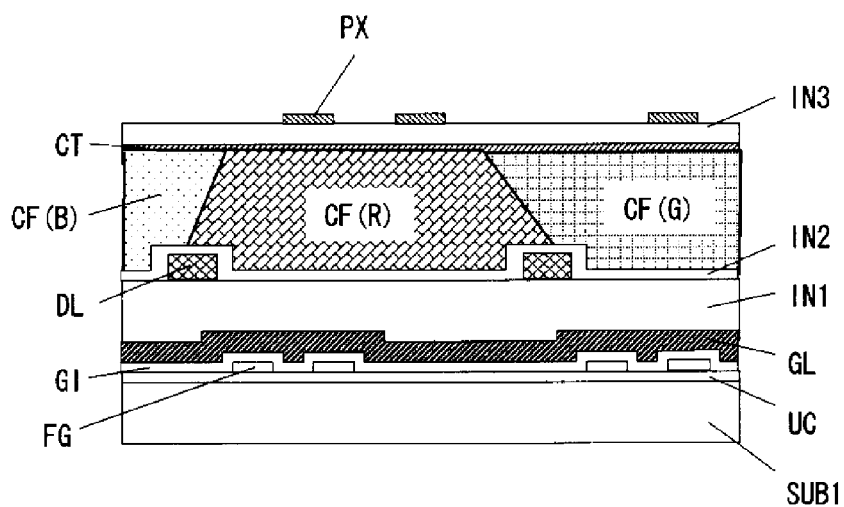
FIG. 3 is a cross-sectional view taken along a line B-B' shown in FIG. 2.

FIG. 2 is a top plan view for explaining the schematic constitution of the pixel of the liquid crystal display device according to the embodiment 1 of the present invention, and FIG. 3 is a cross-sectional view taken along a line B-B' shown in FIG. 2. Hereinafter, the constitution of the pixel of the liquid crystal display device according to the embodiment 1 is explained in conjunction with FIG. 2 and FIG. 3. Thin films other than the color filters can be formed by a known photolithography technique and hence, the detailed explanation of the method of forming these films is omitted.

As shown in FIG. 2, on a liquid-crystal-side surface (front surface, upper surface) of the first substrate SUB1, the gate lines GL are arranged parallel to each other at predetermined intervals, and the drain lines DL are also arranged parallel to each other at predetermined intervals.

The color filter CF having any one of colors consisting of red (R), green (G) and blue (B) is formed over the pixel in a region surrounded by two neighboring drain lines DL and two neighboring gate lines GL. Particularly, in the liquid crystal display device according to the embodiment 1, the respective color filters CF are formed into a stripe shape along the Y direction which is the extending direction of the drain lines DL. For example, the color filter CF(G) of green (G) is formed in the pixels including the pixel at the center of the drawing which are arranged adjacent to each other in the Y direction respectively. On the other hand, the respective color filters CF (color filter CF(R) of red (R), color filter CF(G) of green (G), color filter CF(B) of blue (B)) which are formed into a stripe shape are formed adjacent to each other in the X direction. Further, in the liquid crystal display device according to the embodiment 1, as described later in detail, edge portions of each one of color filters CF arranged adjacent to each other (edge portions on adjacent sides) are formed into a tapered shape and are arranged in an overlapping manner, and the overlapping portion overlaps the drain line DL.

Further, a transparent conductive film not shown in the drawing which is made of a transparent conductive material such as ITO (Indium Tin Oxide), for example, and constitutes the common electrode is formed in a region defined between the gate lines GL and the drain lines DL. The transparent conductive film has, for example, a side portion thereof on a common line side formed in an overlapping manner with the common line, and is electrically connected with the common line through a contact hole. Although the explanation is made with respect to a case where the transparent conductive film is made of ITO, a material of the transparent conductive film is not limited to ITO and the transparent conductive film may be formed of a known ZnO-based transparent conductive film.

Further, a rectangular transparent conductive film which is made of a transparent conductive material such as ITO is formed in the region defined between the gate lines GL and the drain lines DL, and the transparent conductive film functions as the pixel electrode PX. One end of the pixel electrode PX is connected to a source electrode ST of the thin film transistor TFT which is formed on a side portion of the pixel through a contact hole CH3.

As shown in FIG. 3, in the cross-sectional structure of a region along the gate line GL, a base film UC which is an insulation film is formed on a surface of the first substrate SUB1 for blocking the mixing of ion such as Na (sodium) or K (potassium) into the thin film transistor TFT from the first substrate SUB1. As the base film UC, a thin film having the structure where a layer made of silicon nitride (SiN) or the like and a layer made of silicon oxide (SiO) or the like are laminated to each other in order from a first substrate SUB1 side is used, for example. However, the base film UC is not limited to the above-mentioned structure.

A semiconductor layer FG made of amorphous silicon, for example, is formed over the base film UC. The semiconductor layer FG constitutes a semiconductor layer of the thin film transistor TFT, and may be made of polysilicon, microcrystalline silicon or the like.

A gate insulation film GI which is a silicon-oxide (SiO)-based thin film is formed over the semiconductor layer FG so as to cover the semiconductor layer FG. The gate insulation film GI functions as a gate insulation film of the thin film transistor TFT in a region where the thin film transistor TFT is formed. A film thickness and the like of the gate insulation film GI are set corresponding to such a function of the gate insulation film GI. The gate line GL is formed over the gate insulation film GI, and the gate line GL also functions as the gate electrode at a position where the gate line GL overlaps the semiconductor layer FG. An interlayer insulation film IN1 is formed over the gate lines GL. The interlayer insulation film IN1 may preferably be made of silicon oxide (SiO).

The drain line DL which extends in the Y direction in FIG. 2 is formed over the interlayer insulation film IN1. The drain line DL also functions as the drain electrode at a position where a portion of the drain line DL is connected to the semiconductor layer FG through a contact hole CH2 formed in the gate insulation film GI and the interlayer insulation film IN1. The source electrode ST which is formed on the other end side of the semiconductor layer FG together with the drain line DL is connected with the semiconductor layer FG through a contact hole CH1 formed in the gate insulation film GI and the interlayer insulation film IN1. In a region where the gate line GL and the drain line DL interest each other, the above-mentioned interlayer insulation film IN1 is arranged between the gate line GL and the drain line DL thus preventing the gate line GL and the drain line DL from being short-circuited.

Above the drain line DL and the source electrode ST, that is, above the thin film transistors TFT, an interlayer insulation film IN2 is formed as a protective film. The interlayer insulation film IN2 covers the thin film transistor TFT and is made of an inorganic compound. The interlayer insulation film IN2 plays a role of protecting the thin film transistor TFT from a metal component or the like contained in a pigment of the color filter CF which is an organic insulating material. For example, the interlayer insulation film IN2 is formed of a film made of silicon nitride (SiN) which is an inorganic material, and the interlayer insulation film IN2 is formed over the whole surface above the thin film transistor TFT.

Over the interlayer insulation film IN2, the color filters CF according to the embodiment 1 which are colored films (color filters CF) made of an organic insulating material are formed. In the embodiment 1, as described later in detail, the color filters are formed over interlayer insulation film IN2 in order of the color filter CF(R) of red (R), the color filter CF(G) of green (G) and the color filter CF(B) of blue (B). Here, the order of formation of the respective color filters CF is not limited to the above-mentioned order. In this formation of the color filters CF, a region where the neighboring color filters CF overlap the drain line DL and also the neighboring color filters CF overlap each other is used as a light blocking region (light blocking film). That is, the neighboring color filters CF overlap each other over the drain line DL.

In the color overlapping constitution according to the present invention, as shown in FIG. 3, in a region where the color filters CF overlap the drain line DL, an edge portion of the color filter CF(R) is formed to reach a region where the edge portion overlaps the drain line DL in a tapered shape. Further, in this overlapping region, the color filter CF(G) is formed such that an edge portion of the color filter CF(G) having an inversely tapered shape overlaps an edge portion of the color filter CF(R) having a tapered shape. In the present invention, as described later in detail, an upper surface (liquid-crystal-side surface) of the color filter CF(R) and an upper surface (liquid-crystal-side surface) of the color filter CF(G) are formed flat. Also in a region where the color filter CF(G) and the color filter CF(B) are arranged adjacent to each other and in a region where the color filter CF (B) and the color filter CF(R) are arranged adjacent to each other, in the same manner as the region where the color filter CF(R) and the color filter CF(G) are arranged adjacent to each other, inversely tapered edge portions of the color filter CF(B) overlap the tapered edge portion of the color filter CF(G) and the tapered edge portion of the color filter CF(R).

The transparent conductive film which constitutes the common electrode CT and is made of ITO is formed over the color filters CF of respective colors R, G, B, and an interlayer insulation film IN3 is formed over the transparent conductive film. The contact hole CH3 which reaches an extension of the source electrode ST is formed in the interlayer insulation film IN3, the color filter CF and the interlayer insulation film IN2. The transparent conductive film which constitutes the pixel electrode PX formed over the interlayer insulation film IN3 and is made of ITO and the source electrode ST are electrically connected to each other.

[Detailed Constitution of Color Filter]

Figure 4:
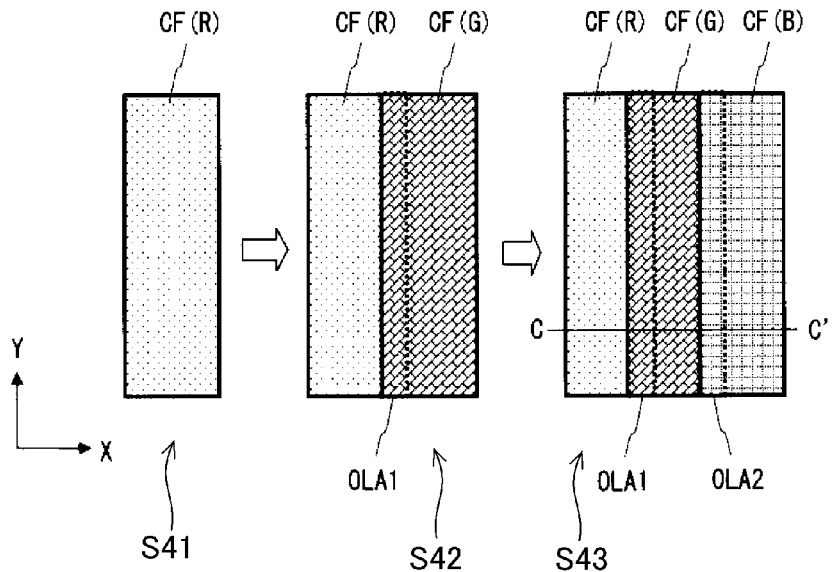
FIG. 4 is a plan view for explaining the schematic constitution of color filters of the liquid crystal display device according to the embodiment 1 of the present invention.
Figure 5:
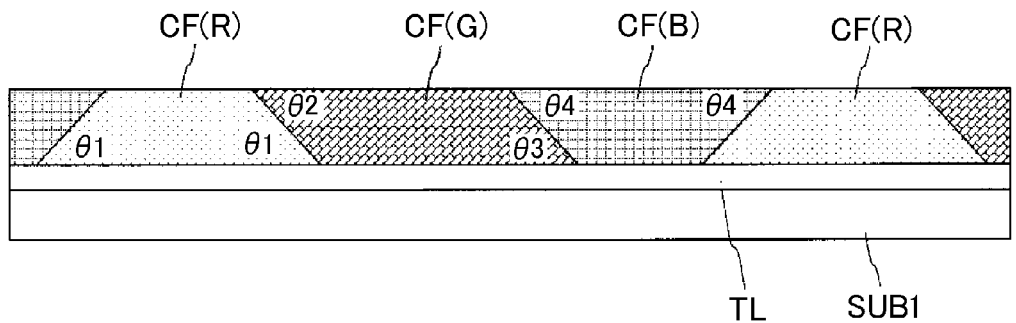
FIG. 5 is a cross-sectional view taken along a line C-C' shown in FIG. 4.

FIG. 4 is a plan view for explaining the schematic constitution of the color filters in the liquid crystal display device according to the embodiment 1 of the present invention, and FIG. 5 is a cross-sectional view taken along a line C-C' in FIG. 4. In FIG. 5, for the sake of brevity, a thin film layer which includes a thin film transistor TFT and respective signal lines such as gate lines formed on an upper surface of the first substrate SUB1 is schematically described as a thin film transistor layer TL.

Hereinafter, the detailed constitution of the color filters in the embodiment 1 is explained in conjunction with FIG. 4 and FIG. 5. In the explanation made hereinafter, the explanation is made with respect to a case where the color filter CF(R) is formed as a color layer to be formed firstly, the color filter CF(G) is formed as a color layer to be formed secondly, and the color filter CF(B) is formed as a color layer to be formed thirdly. However, the order of forming the color filters CF of the respective colors RGB is not limited to such an order. Further, the color filters CF in the embodiment 1 are formed by a so-called color resist method where photo sensitive colored materials (negative resist materials for respective colors of red (R), green (G) and blue (B) (negative color resists)) are applied to a color filter forming surface by a spin coating method, a slit coating method or the like and, thereafter, exposure and developing are performed.

Further, as shown in FIG. 5, edge portions of the color filter CF(R) to be formed firstly are formed into a tapered shape. In patterning the color filter CF into a predetermined shape by exposure and developing (for example, photolithography), by setting an exposure quantity to the edge portions of the predetermined shape smaller than an exposure quantity to a center portion of the predetermined shape, the edge portions can be formed into a tapered shape. Setting the exposure quantity at the edge portions smaller than the exposure quantity at the center portion can be realized by using a halftone exposure technique. Further, a taper angle of the edge portion formed into a tapered shape can be controlled by properly adjusting the exposure quantity.

As shown in FIG. 4, with respect to the color filters CF of the embodiment 1, firstly, as shown in step S41, the color filters CF(R) are formed into a stripe shape. Here, in the embodiment 1, as shown in FIG. 5, the edge portions of the color filter CF(R) on both sides in the X direction are formed into a tapered shape, and a taper angle is set to 40°. A forming condition (exposure condition) of the edge portion here is referred to as a forming condition (exposure condition) θ1. That is, when a tapered shape is formed on the edge portions of the color filter CF(R) in a single form on a flat surface under the forming condition (exposure condition) θ1, the taper angle becomes 40°.

Next, as shown in step S42, the color filter CF(G) is formed in such a manner that the color filter CF(G) overlaps the color filter CF(R) in an overlapping region OLA1 indicated by a dotted line. As shown in FIG. 5, an edge portion of the color filter CF(G) on a color filter CF(R) side which is one edge side in the X direction overlaps the edge portion of the color filter CF(R) formed into a tapered shape. That is, one edge portion of the color filter CF(G) is formed in an inversely tapered shape.

In such a state, usually, the color filter CF(G) gets over an layer of the color filter CF(R) so that a projecting portion is formed on the overlapping portion. Inventors of the present invention have found that the formation of the projecting portion can be suppressed by adjusting a forming condition (exposure condition) of the edge portion of the color filter CF(G) which overlaps the color filter CF(R).

The forming condition (exposure condition) of the edge portion of the color filter CF(G) which overlaps the color filter CF(R) is expressed as a forming condition (exposure condition) θ2. In the embodiment 1 shown in FIG. 5, the forming condition (exposure condition) θ2 is a forming condition (exposure condition) where when a tapered shape is formed on the edge portion of the color filter CF(G) in a single form on a flat surface, a taper angle becomes 30°. On the other hand, when the color filter CF(G) is formed such that the forming condition (exposure condition) of the edge portion of the color filter CF(G) which overlaps the color filter CF(R) is set to the forming condition (exposure condition) where when the tapered shape is formed on the edge portion of the color filter CF(G) in a single form on a flat surface, the taper angle becomes 40° (that is, equal to the taper angle of the color filter CF(R) constituting a lower layer), a projecting portion is formed on an overlapping portion.

Further, as shown in FIG. 5, a forming condition (exposure condition) of an edge portion of the color filter CF(G) on the other edge side is expressed as a forming condition (exposure condition) θ3. The detail of the forming condition (exposure condition) θ3 is explained later.

Next, as shown in step S43, the color filter CF(B) is formed in such a manner that the color filter CF(B) overlaps the color filter CF(G) in an overlapping region OLA2 indicated by a dotted line. One edge portion of the color filter CF(B) in the X direction overlaps the edge portion of the color filter CF(G) formed into a tapered shape, and the other edge portion of the color filter CF(B) in the X direction overlaps an edge portion of the color filter CF(R) formed into a tapered shape. That is, the respective edge portions of the color filter CF(B) are formed into an inversely tapered shape.

Here, usually, the color filter CF(B) gets over an layer of the color filter CF(R) so that a projecting portion is formed on an overlapping portion. However, as has been explained with respect to the overlapping portion between the color filter CF(R) and the color filter CF(G), the formation of the projecting portion can be suppressed by adjusting the forming condition (exposure condition) of the edge portion of the color filter CF(B).

The forming condition (exposure condition) of the edge portion of the color filter CF(B) which overlaps the color filter CF(R) is expressed as a forming condition (exposure condition) θ4. In the embodiment 1 shown in FIG. 5, the forming condition (exposure condition) θ4 is a forming condition (exposure condition) where when a tapered shape is formed on the edge portion of the color filter CF(B) in a single form on a flat surface, a taper angle becomes 30°.

Figure 6:
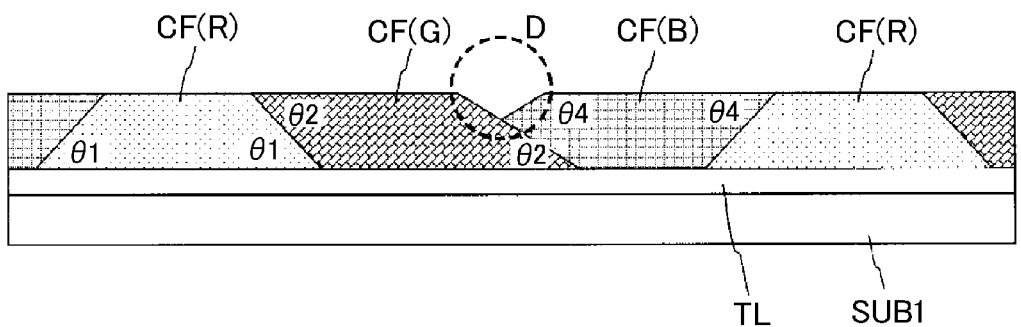
FIG. 6 is a cross-sectional view of the color filters when edge portions of respective colors of color filters are formed at the same taper angle.

Next, the overlapping portion between the color filter CF(G) and the color filter CF(B) is explained in conjunction with FIG. 5 which shows the embodiment 1 and FIG. 6 which shows a comparison example to be compared with the embodiment 1 shown in FIG. 5. It is explained previously that the formation of the edge portion of the color filter CF(G) on a side which overlaps the color filter CF(R) is formed under the forming condition (exposure condition) θ2. Further, It is also explained previously the formation of the edge portion of the color filter CF(B) on a side which overlaps the color filter CF(R) under the forming condition (exposure condition) θ4. In a conventional halftone exposure technique, exposure quantities on both edges to which halftone exposure is applied become equal by taking the symmetric property (forming both edges in the shame shape) of a film to be patterned into consideration.

In FIG. 6 which shows the comparison example, using the conventional halftone exposure technique, the edge portion of the color filter CF(G) on a side where the edge portion overlaps the color filter CF(B) is also formed under the forming condition (exposure condition) θ2 in the same manner as the edge portion of the color filter CF(G) on a side where the edge portion overlaps the color filter CF(R). Further, the edge portion of the color filter CF(B) on a side where the edge portion overlaps the color filter CF(G) is also formed under the forming condition (exposure condition) θ4 in the same manner as the edge portion of the color filter CF(B) on a side where the edge portion of the color filter CF(B) overlaps the color filter CF(R).

The inventors of the present invention have found that, in this case, a recessed portion is formed in an overlapping portion as indicated by a circle D shown in FIG. 6 so that the upper surface of the color filter CF(B) cannot be made flat.

That is, the inventors have found the following. As in the case of the overlapping portion between the color filter CF(R) and the color filter CF(G), when the color filter CF overlaps the edge portion having a taper angle of 40° and is formed under the forming condition (exposure condition) where a taper angle becomes 30° in the case of patterning on a flat surface, the overlapping portion becomes flat. To the contrary, when the forming condition (exposure condition) is set oppositely, that is, as in the case of the overlapping portion between the color filter CF(G) and the color filter CF(B), when the color filter CF overlaps the edge portion having a taper angle of 30° and is formed under the forming condition (exposure condition) where a taper angle becomes 40° in the case of patterning on a flat surface, a recessed portion is formed on the overlapping portion so that the overlapping portion does not become flat.

The inventors of the present invention also have found that, as shown in FIG. 5, the recessed portion which is formed on the overlapping portion explained in conjunction with FIG. 6 can be suppressed by making the forming condition (exposure condition) differ between both edges of the color filter CF(G).

In the embodiment 1 shown in FIG. 5, the edge portion of the color filter CF(G) on the side where the edge portion overlaps the color filter CF(B) is formed under the forming condition (exposure condition) θ3 where the edge portion is formed into a tapered shape with a taper angle of 40° different from the forming condition (exposure condition) θ2 of an edge portion opposite to the edge portion. Further, by forming the edge portion of the color filter CF(B) under the forming condition (exposure condition) θ4 as described above by overlapping the edge portion of the color filter CF(B) to the edge portion of the color filter CF(G), the recessed portion formed on the overlapping portion can be suppressed thus making the overlapping portion flat.

In this manner, in the formation of the color filters CF in the embodiment 1, at the time of forming the respective color filters CF of red (R), green (G) and blue (B), the both edge portions of the color filter CF(R) are formed under the forming condition (exposure condition) θ1. The edge portions of the color filter CF(B) on both sides are formed under the forming condition (exposure condition) θ4. On the other hand, as described previously, the edge portion of the color filter CF(G) on one side is formed under the forming condition (exposure condition) θ2, and the edge portion of the color filter CF(G) on the other side is formed under the forming condition (exposure condition) θ3. Due to such a constitution, in the embodiment 1, as shown in FIG. 5, the upper surfaces of the color filters CF of respective colors can be made flat.

The combination of taper angles is not limited to 30° and 40°, and may be the combination of other angles.

[Manufacturing Method of Color Filters]

Figure 7:
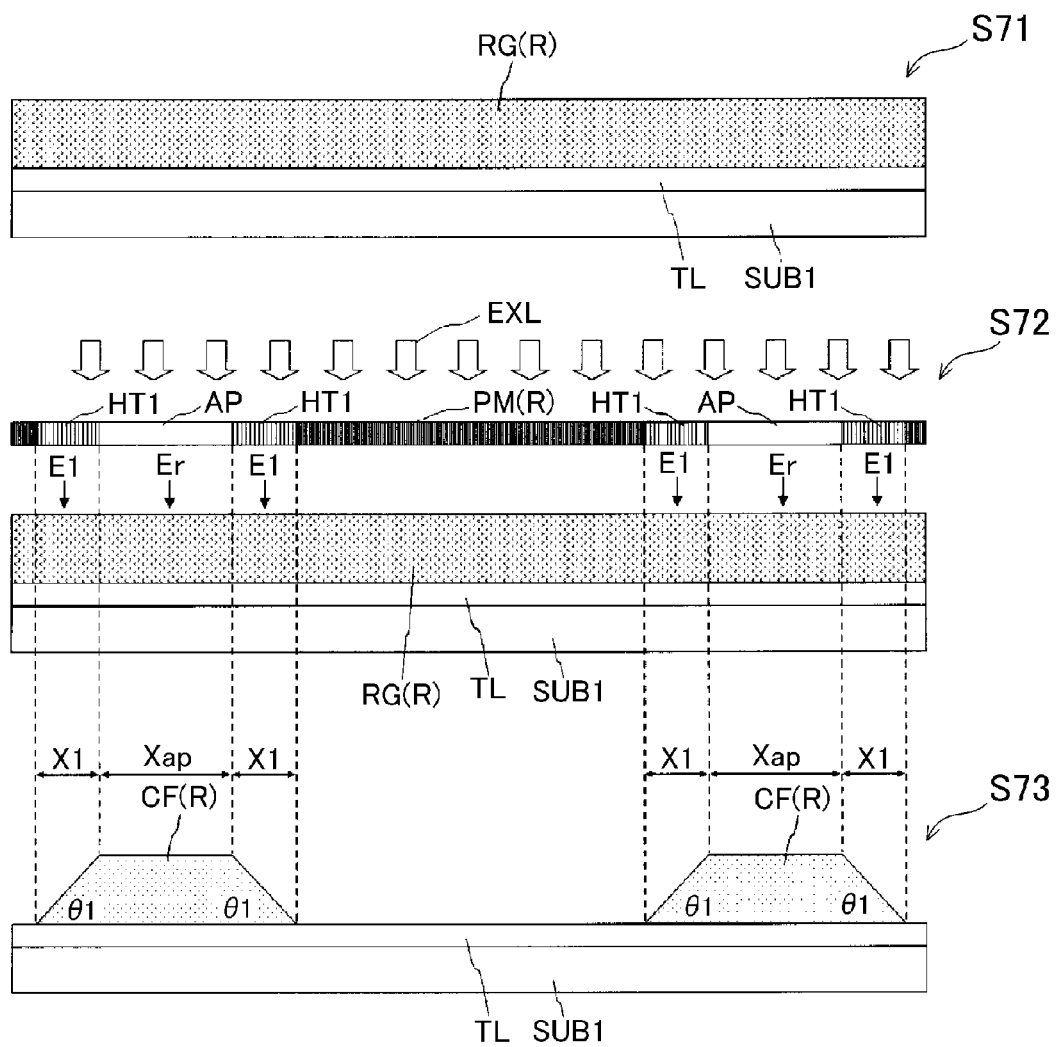
FIG. 7 is a cross-sectional view for explaining a method of forming the color filters of the liquid crystal display device according to the embodiment 1 of the present invention.
Figure 8:
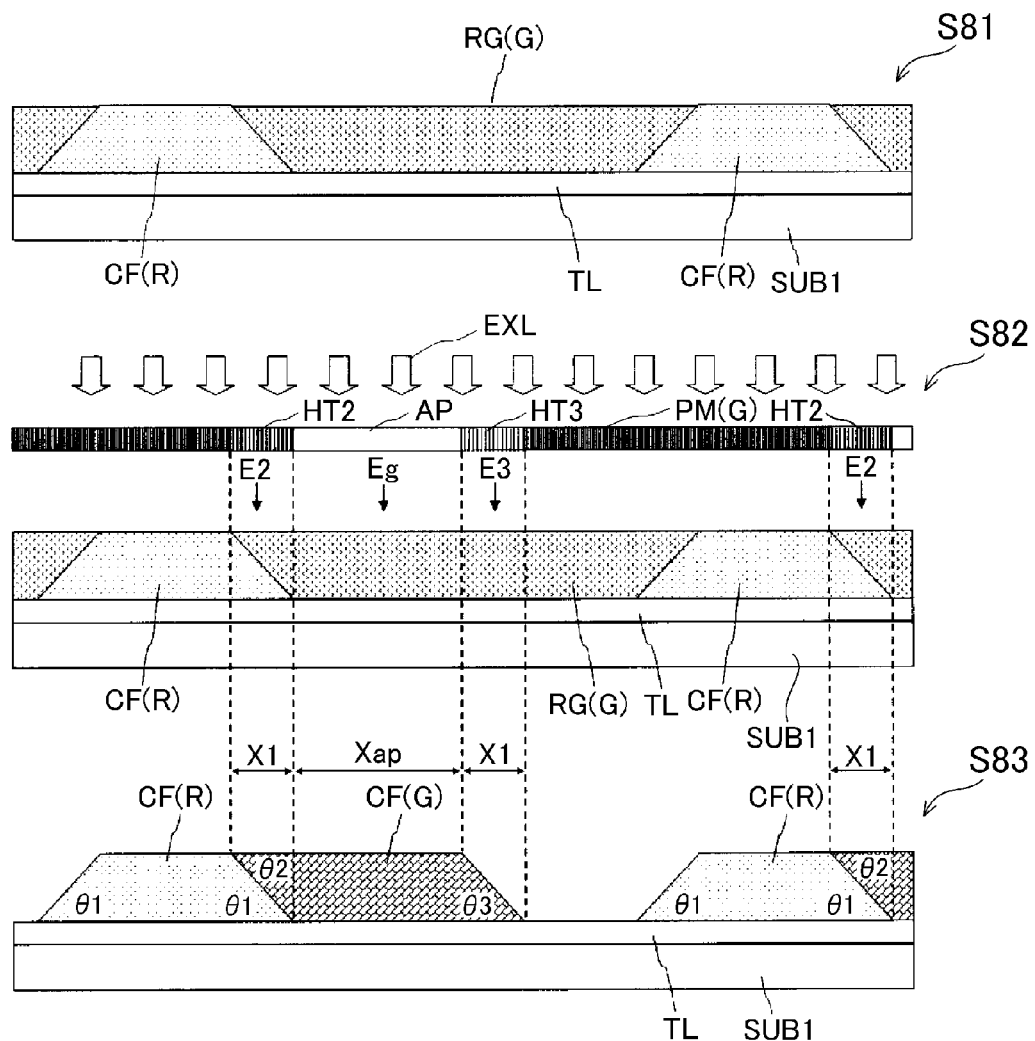
FIG. 8 is a cross-sectional view for explaining the method of forming the color filters of the liquid crystal display device according to the embodiment 1 of the present invention.
Figure 9:
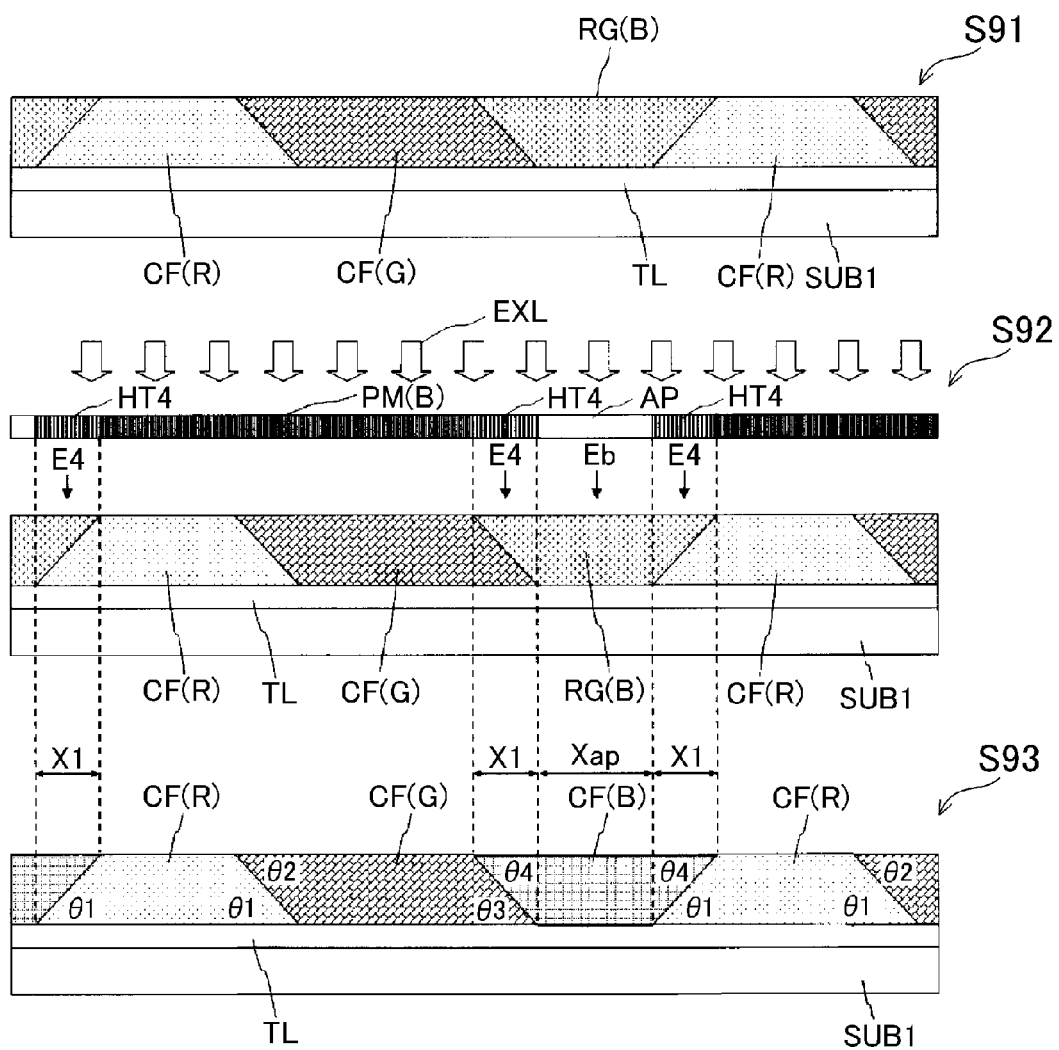
FIG. 9 is a cross-sectional view for explaining the method of forming the color filters of the liquid crystal display device according to the embodiment 1 of the present invention.

FIG. 7 to FIG. 9 are cross-sectional views for explaining a method of forming the color filters in the liquid crystal display device according to the embodiment 1 of the present invention. Hereinafter, the method of forming the color filters is explained in conjunction with FIG. 7 to FIG. 9. FIG. 7 is the cross-sectional view showing steps of forming the color filters CF(R), FIG. 8 is the cross-sectional view showing steps of forming the color filters CF(G), and FIG. 9 is the cross-sectional view showing steps of forming the color filters CF(B).

Firstly, as indicated in step S71 shown in FIG. 7, a negative color resist for red (R) having sensitivity which is a material for forming the color filter CF(R) is applied to an layer of the first substrate SUB1, that is, an upper surface of the thin film transistor layer TL by coating thus forming a color resist film RG(R). After forming the color resist film RG(R), as indicated in step S72, an exposure light EXL is irradiated to the color resist film RG(R) through a photo mask PM(R) corresponding to a position where the color filter CF(R) is formed. Due to the irradiation of the exposure light EXL, the color resist film RG(R) is cured with ultraviolet rays by pattern exposure and hence, a region corresponding to the position where the color filter CF(R) is formed is made insoluble. Here, in an exposure step of the color filter CF(R) of the embodiment 1, as indicated in step S72, the photo mask PM(R) (referred to as a stacked layer mask, a halftone mask) which has an opening region AP corresponding to a forming width Xap of the color filter CF(R) and halftone regions HT1 corresponding to a light blocking region width X1 between neighboring pixels is used. Here, in the halftone region HT1, a transmission quantity of exposure light EXL is set to an exposure quantity E1 which satisfies the forming condition (exposure condition) θ1 where the color resist film RG(R) is formed into a tapered shape with a taper angle of 40°. Further, in the opening region AP, exposure light EXL of exposure quantity Er is directly irradiated to the color resist film RG(R).

After performing the above-mentioned exposure, developing and baking are properly performed thus removing the color resist film RG(R) in a region where exposure is not performed so that, as indicated in step S73, the color filter CF(R) where a width of a color filter region which constitutes a flat portion becomes a width Xap and a width of a tapered portion which forms the edge portion of the color filter CF(R) becomes a width X1 is formed with a taper angle of 40°.

Next, as indicated in step S81 shown in FIG. 8, a negative color resist for green (G) having sensitivity which is a material for forming the color filter CF(G) is applied to a liquid-crystal-surface-side of the first substrate SUB1, that is, the upper surface of the thin film transistor layer TL and an upper surface of the color filter CF(R) by coating thus forming a color resist film RG(G). Although the overlapping portion between the color filter CF(R) and the color resist film RG(G) is schematically described as a flat portion in step S81, in the actual constitution, a part of the color resist film RG(G) gets over a flat surface of the color filter CF(R) thus forming a projecting portion.

After forming the color resist film RG(G), as indicated in step S82, exposure light EXL is irradiated to the color resist film RG(G) through a photo mask PM(G) corresponding to a position where the color filter CF(G) is formed. Due to the irradiation of the exposure light EXL, the color resist film RG(G) is cured with ultraviolet rays by pattern exposure and hence, a region corresponding to the position where the color filter CF(G) is formed is made insoluble.

Here, in an exposure step of the color filter CF(G) of the embodiment 1, as indicated in step S82, the photo mask PM(G) which has an opening region AP corresponding to a forming width Xap of the color filter CF(G) and two halftone regions HT2, HT3 corresponding to a light blocking region width X1 between neighboring pixels is used. Here, in one halftone region HT2, a transmission quantity of exposure light EXL is set to an exposure quantity E2 which corresponds to the above-mentioned forming condition (exposure condition) θ2 where when the color filter CF(G) is formed on a flat plate in a single form, a taper angle becomes 30°. In the other halftone region HT3, a transmission quantity of exposure light EXL is set to an exposure quantity E3 which corresponds to the above-mentioned forming condition (exposure condition) θ3 where when the color filter CF(G) is formed on a flat plate in a single form, a taper angle becomes 40°. Further, in the opening region AP, exposure light EXL of exposure quantity Eg is directly irradiated to the color resist film RG(G).

After performing the above-mentioned exposure, developing and baking are properly performed thus removing the color resist film RG(G) in a region where exposure is not performed so that, as indicated in step S83, the color filter CF(G) where a width of a color filter region which constitutes a flat portion becomes a width Xap and a width of a tapered portion which forms the edge portion of the color filter CF(G) becomes a width X1 is formed. Here, on a left edge portion of the color filter CF(G) in step S83, the color filter CF(G) is formed on the edge portion (taper angle 40°) of the color filter CF(R) in an overlapping manner under the above-mentioned forming condition (exposure condition) θ2 and hence, a surface of a portion where the color filter CF(R) and the color filter CF(G) overlap each other becomes flat. On the other hand, on a right edge portion of the color filter CF(G) shown in FIG. 8C, the color filter CF(G) is formed into a tapered shape under the above-mentioned forming condition (exposure condition) θ3 and hence, the right edge portion has the inclination of taper angle of 40°.

Next, as indicated in step S91 shown in FIG. 9, a negative color resist for blue (B) having sensitivity which is a material for forming the color filter CF(B) is applied to the liquid-crystal-side surface of the first substrate SUB1 by coating thus forming a color resist film RG(B). Although the overlapping portion of the color filter CF(G) and the color resist film RG(B) and the overlapping portion of the color filter CF(R) and the color resist film RG(B) are schematically described as flat portions in step S91, in the actual constitution, a part of the color resist film RG(B) gets over a flat surface of the color filter CF(G) and a flat surface of the color filter CF(R) thus forming projecting portions.

After forming the color resist film RG(B), as indicated in step S92, exposure light EXL is irradiated to the color resist film RG(B) through a photo mask PM(B) corresponding to a position where the color filter CF(B) is formed. Due to the irradiation of the exposure light EXL, the color resist film RG(B) is cured with ultraviolet rays by pattern exposure and hence, a region corresponding to the position where the color filter CF(B) is formed is made insoluble.

Here, in an exposure step of the color filter CF(B) of the embodiment 1, as indicated in step S92, the photo mask PM(B) which has an opening region AP corresponding to a forming width Xap of the color filter CF(B) of color B and halftone regions HT4 corresponding to a light blocking region width X1 between neighboring pixels is used. In the halftone region HT4, a transmission quantity of exposure light EXL is set to an exposure quantity E4 which corresponds to the above-mentioned forming condition (exposure condition) θ4 where when the color filter CF(B) is formed on a flat plate in a single form, a taper angle becomes 30°. Further, in the opening region AP, exposure light EXL of exposure quantity Eb is directly irradiated to the color resist film RG(B).

After performing the above-mentioned exposure, developing and baking are properly performed thus removing the color resist film RG(B) in a region where exposure is not performed so that, as indicated in step S93, the color filter CF(B) where a width of a color filter region which constitutes a flat portion becomes a width Xap and a width of an inversely tapered portion which forms the edge portion of the color filter CF(B) becomes a width X1 is formed. Also in this case, on an edge portion of the color filter CF(B) in step S93 shown in the drawing, the color filter CF(B) is formed on the edge portion (taper angle 40°) of the color filter CF(G) and on the edge portion (taper angle 40°) of the color filter CF(R) in an overlapping manner under the above-mentioned forming condition (exposure condition) 84. Accordingly, a surface of a portion where the color filter CF(G) and the color filter CF(B) overlap each other and a surface of a portion where the color filter CF(R) and the color filter CF(B) overlap each other become flat respectively.

As has been explained above, in the liquid crystal display device of this embodiment 1, for respective resist materials (color resists) of respective colors for forming color filter layers (colored layers) of three colors, the first forming condition (transmission quantity of the halftone mask, exposure output and the like) where the thin film layer having a taper angle of 40° can be formed on the planer glass substrate in a single form, and the second forming condition where the thin film layer having a taper angle of 30° can be formed on the planer glass substrate in a single form are set in advance and, in forming the color filter layer of at least one color out of three colors, the color filter layer is formed in a state where the forming condition differs between one edge portion and the other edge portion and hence, unevenness of the overlapping portion of color filters arranged adjacent to each other can be largely suppressed. As a result, in the liquid crystal display device having the COA structure, it is unnecessary to additionally form a leveling film above the color filter layer whereby the number of steps can be largely reduced.

Here, out of colored layers of three colors consisting of red (R), green (G), and blue (B) which are formed by a color resist method using photosensitive colored materials, in forming the colored layers of different two colors which are arranged adjacent to each other in an overlapping manner, at the time of exposing photosensitive colored materials which form colored layers of red (R), green (G), and blue (B), with respect to at least one colored material, it is sufficient to perform exposure with different exposure quantities only at one overlapping portion and the other overlapping portion. Accordingly, the photo mask whose exposure quantity differs between both edges is only used for forming at least one of colored layers and hence, it is possible to acquire outstanding advantageous effects that the step control which becomes necessary for forming the colored layers becomes easy, and the control of photo masks also becomes easy.

With respect to the formation of the color filters CF described in the embodiment 1, the explanation has been made with respect to the case where the color filter CF is formed above the thin film transistor layer formed on the upper surface of the first substrate SUB1. However, the formation of the color filters CF is not limited to such a case. For example, the present invention is also applicable to a case where the color filters CF are formed over an upper surface (liquid crystal side surface, opposedly facing surface) of the second substrate SUB2 which is arranged to face the first substrate SUB1 in an opposed manner by way of the liquid crystal layer, for example. Also in this case, the upper surfaces of the color filters CF can be made flat and hence, it is unnecessary to form a leveling film additionally thus reducing the number of steps necessary for forming the second substrate SUB2.

Further, in the embodiment 1, in forming all color filters CF of red (R), green (G), and blue (B), the halftone mask which has the halftone region is used. However, by properly combining resist materials of RGB, a light quantity of exposure light and the like, edge portions are formed with desired taper angles, and a halftone mask is used only in a photo mask PM(G) for forming the color filter CF(G) which requires exposure with different exposure quantity.

Further, in the embodiment 1, the edge portions of the color filter of green (G) are respectively exposed with different exposure quantities. However, the present invention is not limited to such constitution, and the edge portions of the color filter of other color may be exposed with different exposure quantities.

Embodiment 2

Figure 10:
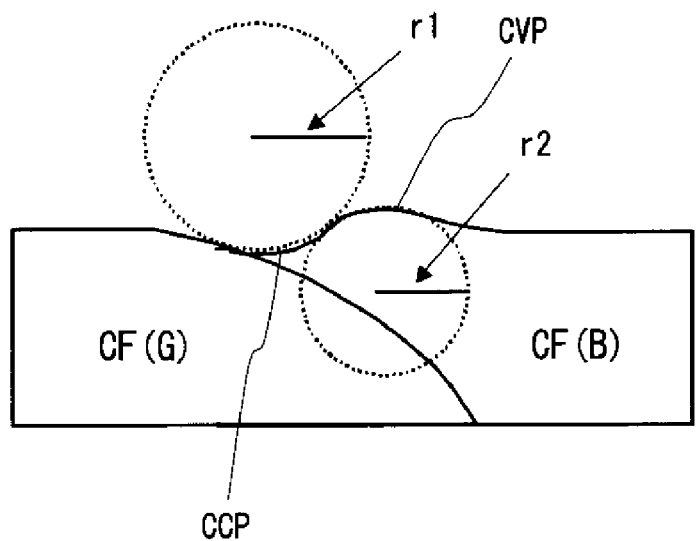
FIG. 10 is a view for explaining the schematic constitution of color filters of a liquid crystal display device according to an embodiment 2 of the present invention.

FIG. 10 is a view for explaining the schematic constitution of color filters in a liquid crystal display device according to the embodiment 2 of the present invention. The liquid crystal display device of the embodiment 2 is explained in conjunction with FIG. 10 hereinafter.

The cross-sectional view shown in FIG. 10 shows a case where after color filters CF(G) are formed, color filters CF(B) arranged adjacent to the color filters CF(G) are formed. Particularly, the color filters CF(G) and the color filters CF(B) are arranged such that an edge portion of the color filter CF(B) overlaps an upper surface of an edge portion of the color filter CF(G) formed into a tapered shaped. Here, with respect to the edge portion of the color filter CF(B) which is formed into an inversely tapered shape because of being formed on the tapered shape film in an overlapping manner, depending on the forming condition (exposure condition), a recessed portion CCP is formed in a boundary portion between the color filter CF(B) and the color filter CF(G), and also a projecting portion CVP is formed in the boundary portion between the color filter CF(B) and the color filter CF(G).

The above-mentioned recessed portion CCP and the projecting portion CVP have, as shown in FIG. 10, an approximately arcuate curved surface. Here, a radius of curvature of the arcuate curved surface is determined as shown in FIG. 10. That is, the recessed portion CCP is an indented shape with a radius of curvature r1, and the projecting portion CVP is a bulging shape with a radius of curvature r2.

Further, when the color filters CF shown in 10 are formed over a surface of the second substrate SUB2, an alignment film not shown in the drawing is formed over the upper surface of the color filters CF. Here, the alignment film is an extremely thin film having an extremely thickness compared to a film thickness of the color filters CF and hence, the alignment film is also formed tracing stepped portions (recessed portion CCP and the projecting portion CVP) formed on the surface of the color filter CF. Accordingly, in applying alignment treatment (rubbing) to the alignment film, a sufficient contact cannot be acquired between a rubbing cloth and a surface of the alignment film and hence, a rubbing defect occurs whereby a region where alignment treatment is not sufficiently performed (referred to as domain) is generated. As a result, there arises a display defect such as, for example, leaking of light in the domain even in a black display.

Inventors of the present invention have measured the relationship between a radius of curvature of a stepped portion and intensity of domain (relative value). Here, the domain intensity (relative value) means a value which indicates intensity of leaking of light due to the above-mentioned rubbing defect as a relative value. The smaller the value of the domain intensity, the smaller strength of leaking of light becomes, that is, the smaller the degree of the display defect becomes. With respect to the domain intensity (relative value) shown in FIG. 11, when the domain intensity becomes 0.6 or less, a display defect caused by leaking of light does not cause any problem.

Figure 11:
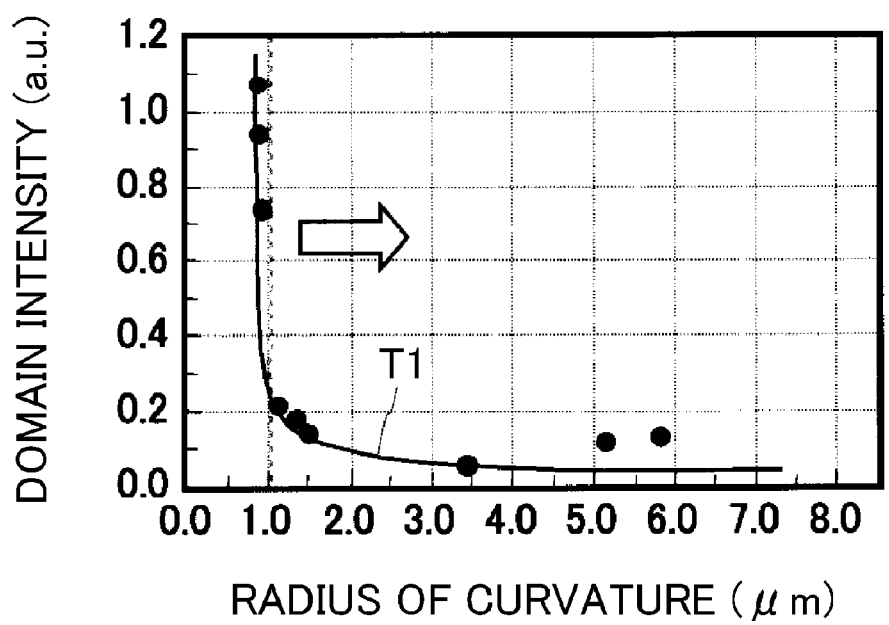
FIG. 11 is a view showing measurement results of a radius of curvature r1 and domain intensity in an overlapping region of color filters.

FIG. 11 shows a result of measurement. In FIG. 11, a radius of curvature is taken on an axis of abscissas, and domain intensity (relative value) is taken on an axis of ordinates. As can be clearly understood from a curve T1 shown in FIG. 11, it is found that when the radius of curvature indicated by a dotted line is 1.0 µm or more, the domain intensity becomes 0.2 or less and hence, the occurrence of domain can be suppressed. As a result, even when a change in a material of a cloth used for rubbing (rubbing cloth), a diameter of a bristle, density of bristles or the like is taken into consideration, by setting the radius of curvature of the arcuate curved surface in the overlapping portion of the color filters to 1.0 µm or more, that is, by leveling the overlapping portion of the color filter to an extent that the radius of curvature becomes 1.0 µm or more, a display defect caused by the occurrence of domain does not become a problem.

Setting of the radius of curvature of the arcuate curved surface to 1.0 µm or more can be realized using the method explained in the embodiment 1. That is, the forming conditions (exposure conditions) θ1 to θ4 explained in the embodiment 1 may be set to an extent that the above-mentioned radius of curvature can be set to approximately 1.0 µm or more.

Although the present invention has been specifically explained in conjunction with the embodiments of the present invention, the present invention is not limited to the embodiments of the present invention, and various modifications can be made without departing from the gist of the present invention. The present invention is not limited to the liquid crystal display device, and is also applicable to other display devices which have the structure where color filters are formed in an overlapping manner.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A manufacturing method of a liquid crystal display device having first color filters, second color filters and third color filters formed adjacent to each other on one substrate of a pair of substrates which are arranged to face each other in an opposed manner, the manufacturing method comprising;
    a first patterning step in which the first color filters are patterned;
    a second patterning step in which the second color filters are patterned in such a manner that one edge portion of the second color filter overlaps and is in physical contact with one edge portion of the first color filter; and
    a third patterning step in which third color filters are patterned in such a manner that one edge portion of the third color filter overlaps and is in physical contact with the other edge portion of the second color filter different from the one edge portion of the second color filter, wherein
    the second patterning step comprises: a second color resist film exposure step in which a second color resist film is exposed after the second color resist film is applied; and a second color resist development step in which the second color resist film is developed, and
    in the second color resist film exposure step, an exposure quantity in a region corresponding to the one edge portion of the second color filter and an exposure quantity in a region corresponding to the other edge portion of the second color filter differ from each other.

2. The manufacturing method of a display device according to claim 1, wherein the third patterning step comprises a step where the other edge portion of the third color filter, which is different from the one edge portion of the third color filter, is formed in an overlapping manner on the other edge portion of the first color filter different from the one edge portion of the first color filter, the first patterning step comprises a first color resist film exposure step where a first color resist film is exposed after the first color resist film is applied, and the third patterning step comprises a third color resist film exposure step where a third color resist film is exposed after the third color film is applied, in the first color resist film exposure step, an exposure quantity in a region corresponding to the one edge portion of the first color filter and an exposure quantity in a region corresponding to the other edge portion of the first color filter are equal, and in the third color resist film exposure step, an exposure quantity in a region corresponding to the one edge portion of the third color filter and an exposure quantity in a region corresponding to the other edge portion of the third color filter are equal.

3. The manufacturing method of a display device according to claim 1, wherein the second color resist film is exposed by way of a photo mask in the second color resist film exposure step, the photo mask is a halftone mask where a light transmission quantity in a region corresponding to the one edge portion and the other edge portion of the second color filter is smaller than a light transmission quantity in a region other than the one edge portion and the other edge portion, and a light transmission quantity in a region corresponding to the one edge portion and a light transmission quantity in a region corresponding to the other edge portion are different from each other.

4. The manufacturing method of a display device according to claim 1, wherein a plurality of pixels each of which includes a pixel electrode and a thin film transistor are formed on the one substrate, and the first color filter, the second color filter and the third color filter are formed above the thin film transistor.

5. The manufacturing method of a display device according to claim 4, wherein the pixel electrode is formed above the first color filter, the second color filter and the third color filter.

6. The manufacturing method of a display device according to claim 4, wherein a plurality of drain lines which supply a video signal to the pixel electrodes through the thin film transistors are formed on the one substrate, and a overlapped region of any two color filters of the first color filter, the second color filter and the third color filter overlaps the drain line.

7. The manufacturing method of a display device according to claim 1, wherein the first color filter, the second color filter and the third color filter have colors which differ from each other, and the colors which differ from each other are red, green and blue.

8. The manufacturing method of a display device according to claim 1, wherein a overlapped region where any two color filters of the first color filter, the second color filter and the third color filter has an approximately arcuate curved surface, and a radius of curvature of the curved surface is set to $1.0\,\mu m$ or more.

\* \* \* \* \*